United States Patent [19]

Rountree

[11] Patent Number: 4,529,301

[45] Date of Patent: Jul. 16, 1985

[54] COLOR PRINT SYSTEM

[76] Inventor: Philip L. Rountree, Brigham Rd., Gates Mills, Ohio 44040

[21] Appl. No.: 542,720

[22] Filed: Oct. 17, 1983

[51] Int. Cl.³ .................. G03B 27/32; G03B 27/52
[52] U.S. Cl. ........................................ 355/77; 355/32
[58] Field of Search .............................. 355/32, 77, 74

[56] References Cited

U.S. PATENT DOCUMENTS 3,165,970  1/1965  Pelletier ........................... 355/74 X Primary Examiner—Richard A. Wintercorn
Attorney, Agent, or Firm—Oldham, Oldham & Weber Co.

[57] ABSTRACT

A system for optimizing the printing of photographs. For color prints, a piece of photography paper is progressively and sequentially exposed to varying amounts of light of the primary colors, developing a color matrix on the paper. A neutral grey area on the paper identifies the optimum settings for the color filters and the exposure settings for the print system. A similar technique is presented for development of black and white prints by the generation of a grey level matrix, varying as to exposure setting.

7 Claims, 8 Drawing Figures

COLOR PRINT SYSTEM

TECHNICAL FIELD

The present invention relates to the field of calibrating photograph printing systems. The present invention eliminates the previously known trial and error procedure for establishing enlarger calibration settings. The product by process herein described will enable the photographer to use only one sheet of photography paper in establishing the enlarger calibration settings.

BACKGROUND ART

In the past, establishing the correct calibration settings for photograph enlargers has been done on strictly a trial and error basis. The photographer would run a print, adjusting the exposure density of the photograph until he was satisfied. Then he would adjust the color filters, by trial and error, until he was satsified with its color. This expended valuable time and numerous sheets of expensive photography paper. Previously, there was no known system or technique by which a photographer could set the exposure density and color filters for optimum printing without expending costly paper and valuable time.

SUMMARY OF THE INVENTION

An object of the present invention is to allow the photographer to calibrate photograph enlargement settings using a single sheet of photography paper.

Another object of the present invention is to lower the cost in calibrating photograph enlargers.

Yet another object of the present invention is to eliminate the trial and error procedure for calibrating photograph enlargers.

Still another object of the present invention is to obtain high quality photograph enlargements from slide and/or negative film.

Another object of the present invention is to obtain a plurality of distinct shades of grey between white and black for high quality exposure of black and white prints.

Also another object of the present invention is the generation of a color spectrum chart to assist in calibrating photograph printing systems.

The foregoing and other objects of the invention are achieved by a process for making color prints, comprising the steps of: exposing photography paper to a first color light source; progressively and sequentially exposing first strips of said paper to decreasing amounts of light of a second color; and progressively and sequentially exposing second strips of said paper to decreasing amounts of light of a third color, said second strips being normal to said first strips.

BRIEF DESCRIPTION OF THE DRAWINGS

For a complete understanding of the objects, techniques, and structure of the invention, reference should be had to the following detailed description and accompanying drawings, wherein.

BEST MODE FOR CARRYING OUT THE INVENTION

Figure 1:
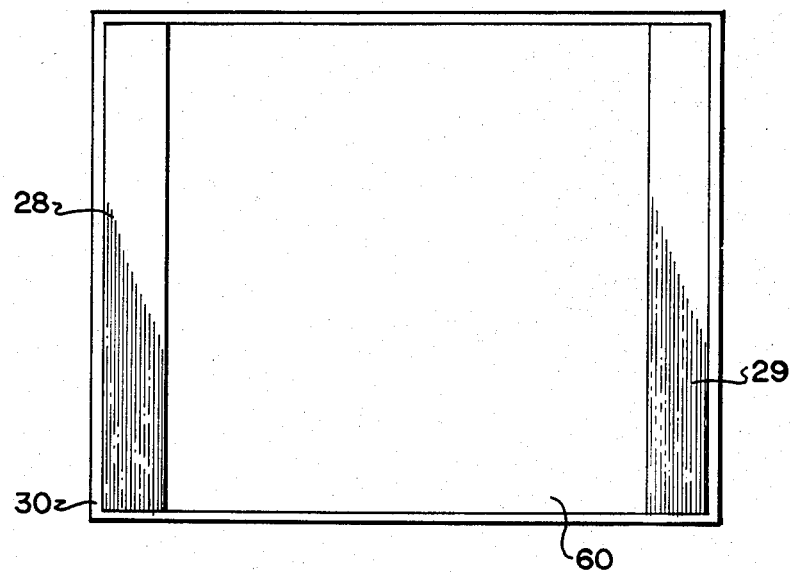
FIG. 1 is a top view of the photography paper received within a tray.

It is well known in the photography field that photograph enlargers contain various types of filter systems. Some of these filter systems change with time. The previous method of calibrating these filter systems was a trial and error procedure of adjusting and readjusting the filters until personal satisfaction was achieved.

Photography paper is labeled with an emulsion number and a designation for what is necessary to obtain white light correction. However, this labelling is only correct when the paper is manufactured. As the paper ages and encounters temperature changes, these determinations change, but these determinations can provide the photographer with an initial reference for practicing the present invention as will become apparent from the explanation hereinafter.

It is well known in the photography field that photograph enlargers contain various types of filter systems. These filter systems vary from type to type, and from enlarger to enlarger within the various types. Further, it is well known that these filter systems vary with respect to time from mechanical or electrical change as well as due to filters fading.

Also, it is well known that enlarger bulbs vary with time of use, in general becoming warmer in color as it is used.

Further, it is well known that the chemistry implicit in the photograph printing systems vary from batch to batch or from emulsion to emulsion, and each varies with respect to time; that is, printing paper, film, development chemicals, and so forth.

In addition, there are differences in processing techniques from one operator to another, for example, whether drain time is included in development times, whether agitation is performed uniformly, and so forth.

The previous method for accounting for all the sources of error was a trial and error procedure of adjusting and readjusting the time of exposure, enlarger stop opening (f-stop), and varying the filters until the approximate correct exposure was reached and then color balance achieved.

Film varies slightly from roll to roll. Enlargers vary enormously between types and within types, but vary slowly with time for a particular enlarger. Development chemistry varies slightly from batch to batch, but varies enormously with time. Printing paper varies widely in manufacture and also changes drastically with time. Variations in the chemistry of undeveloped film, paper, and development solutions can be minimized by refrigeration, but the variations still exist.

Photography paper is labeled with an emulsion number. Color film is usually accompanied by suggested filter corrections and an exposure factor which has been found for a particular printing system at the paper manufacturer, but usually bears no resemblance to an individual enlarger system. Further, this labeling is only correct at the time of manufacture. As the paper ages and encounters temperature changes, these determination change, but these determinations can provide the photographer with an initial reference for practicing the present invention as will become apparent from the explanation hereinafter.

Typical paper emulsions will specify a yellow correction from −10 points to +50 points, and magenta correction from −10 points to +50 points. Sometimes an exposure factor is given. These are so-called "white light corrections" given by the manufacturer.

Usually, most all photograph printing systems are designed so that the sensitivity to red light is deficient, thereby requiring that blue and green light components be diminished by yellow and magenta filtration, respectively, to obtain perfect color balance. Thus the operator must vary only two filters to obtain color balance. Rarely do green or blue deficiencies occur, but should they, they can be handled using the same procedure.

In the case of black and white printing paper, the exposure factor is often printed on the label.

As shown in FIG. 1, the invention consists of a tray 30 with a depression sufficiently large to fit a sheet of printing paper 60. For the sake of example, we will use an 8"×10" piece of printing material, although any standard size piece of paper could be similarly accommodated. The photo tray 30 is of a rectangular design with its sides being ⅛ to 1 inch in height, preferably ¼ to ¾ inch. The photo paper 60 is laid face up in the tray 30 and the tray and paper are then placed under an enlarger. The enlarger is focused on this paper and set to a specified f-stop and exposure time.

A test negative or a slide is placed in the enlarger. This slide or negative will be color-balanced, that is, a representation of a neutral image on a particular kind of film. An example would be a shot of an 18% grey card on VR-100 film. To be precise, this slide or negative should be from the same film the operator wishes to print, since film emulsions do vary from roll to roll. It is important that this slide negative be exposed with light of the same color temperature (daylight is 5800° K.).

The photo paper 60 is first exposed to red light only. This is accomplished by placing the cyan filter at zero and the magenta and yellow filters at their maximum settings. Exposure is made at a specified f-stop and time, for example, f5.6 for five seconds.

Figure 2:
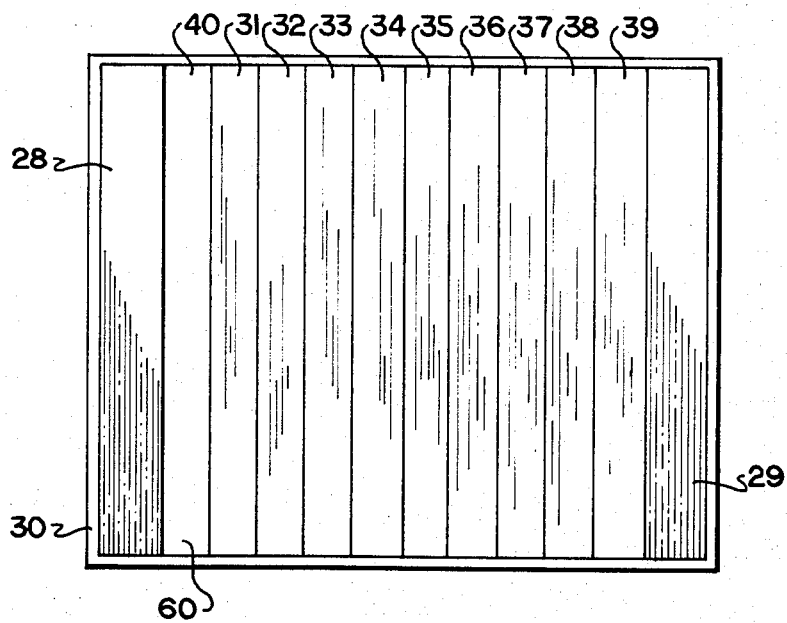
FIG. 2 is a top view of the photography paper with strips in vertical position.

In perfect darkness, the strips 28 and 29 are placed vertically on the photo paper 60 at the extreme ends. For the 8"×10" example, these rectangular strips are 1 inch wide and 8 inches long. These strips form the border of an 8"×8" square. Strips 31–39 are placed vertically on the photo paper 60 as shown in FIG. 2. The strips 31–39 are of a rectangular shape and vary in number from 5 to 50, preferably 5 to 10. The strips 31–39 cover between 80 to 95%, preferably 80 to 90%, of the photo paper 60, thus exposing only 5 to 20%, preferably 5 to 10%, of the photo paper. Thus there is vertical chute 40 left uncovered. The tray 30 is again placed under the enlarger with the strips in their vertical positions. The enlarger is set with red and green light completely filtered out (cyan and magenta filters are placed at maximum settings). Blue light is varied in specific intervals of 1 to 20 points of density through the anticipated range for 1 to 20 seconds, preferably 2 to 7 seconds, at an exposure setting (f-stop) from 2.8 to 11, preferably 4 to 8. The first exposure is made in chute 40, as shown in FIG. 2, at the lowest point of yellow filtration anticipated, for example, yellow filtration set at zero to 120, preferably from zero to 90.

Figure 3:
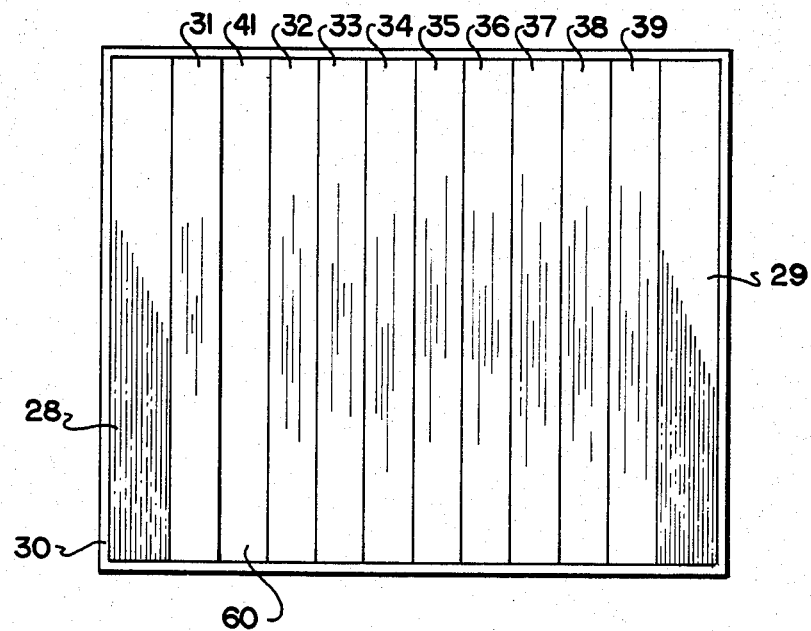
FIG. 3 is a top view of the photography paper with strips in next incremental vertical position.

Next, the enlarger is deactivated. The first incremental vertical strip 31 is slid over sequentially one increment, thus covering chute 40 that had previously been exposed to blue light and uncovering the next immediate chute 41 for increased exposure, as shown in FIG. 3. The blue light setting is then decreased by an increment of 1 to 30 points of density, preferably 2½ to 20, and then the enlarger is activated for the same period of time at the same f-stop. This process is repeated until all of the vertical chutes have been incrementally exposed to decreasing amounts of blue light, with the exposure of each successive chute being decreased over that of the previous chutes, sequentially across the paper.

Figure 4:
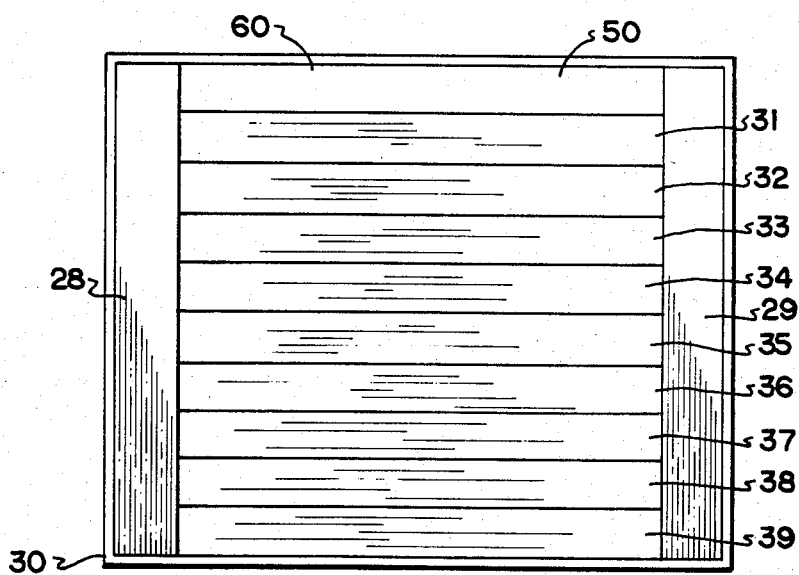
FIG. 4 is a top view of the photography paper with strips in horizontal position.

In total darkness, the strips 31–39 are removed, leaving in place strips 28 and 29, and placed in the horizontal position of FIG. 4, leaving chute 50 uncovered. The tray 30 is placed under the enlarger with the strips 31–39 in their horizontal position as shown, exposing only the top chute 50. The enlarger is set with red and blue light completely filtered out, with the green light being free to vary over the anticipated range of values (cyan and yellow filters at maximum settings). The enlarger is activated and the chute 50 of the paper 60 is exposed to green light for the same time period at the same f-stop as before.

Figure 5:
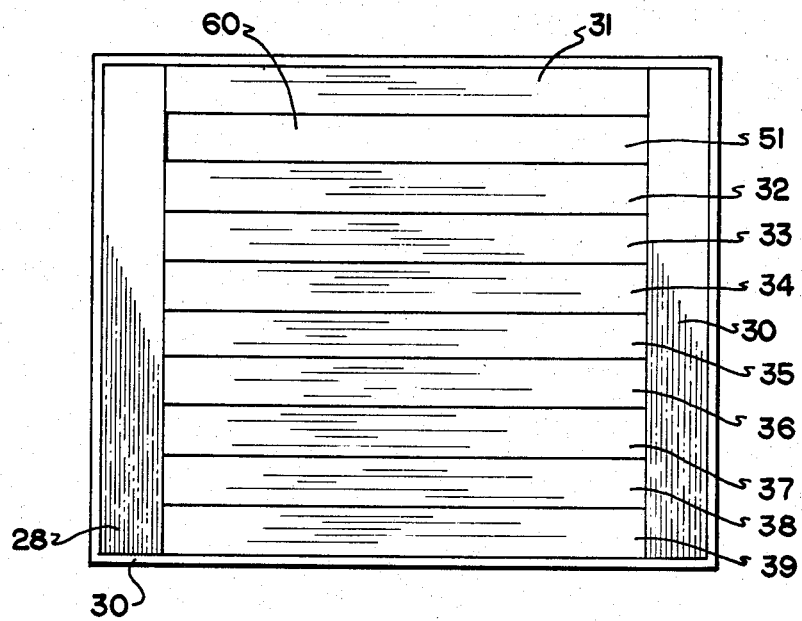
FIG. 5 is a top view of the photography paper with strips in next incremental horizontal position.

Next, the enlarger is deactivated. As shown in FIG. 5, the first incremental horizontal strip 31 is slid up sequentially one increment, thus covering the chute 50 that had previously been exposed to the first setting of green light and exposing the next horizontal chute 51. The green light setting is then decreased by an increment of 1 to 30 points of density, preferably 2½ to 10 points, and then the enlarger is activated for the identical exposure time and f-stop as before. This repetitive process is continued until the entire paper 60 has been incrementally exposed to green light one horizontal chute at a time, and sequentially down the paper. The photo paper is removed from the tray, developed normally, and dried.

Figure 6:
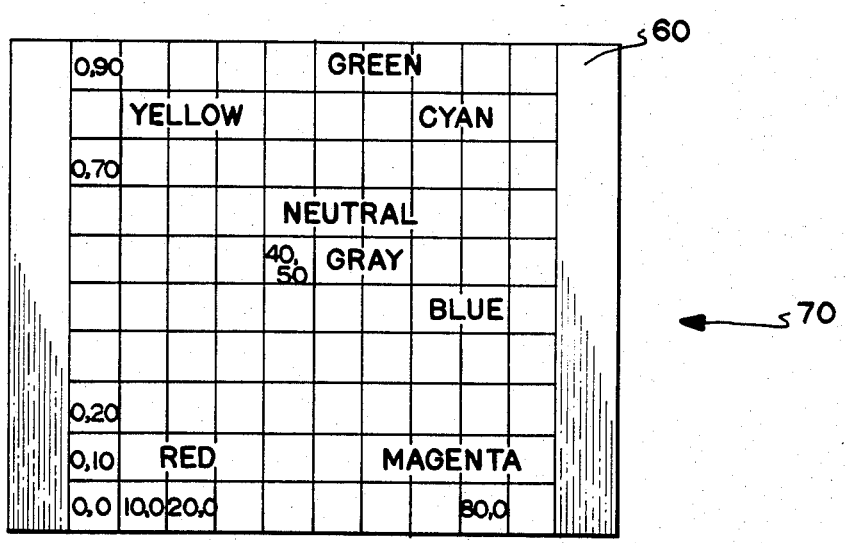
FIG. 6 is a top view of a color spectrum photograph generated according to the concept of the invention.

As depicted in FIG. 6, a photograph 70 is thus produced having 25 to 256, preferably 25 to 100, color squares. These squares vary in color and, in combination, create a color spectrum or matrix. Somewhere on the photograph 70 there should appear neutral color squares of varying shades. The nearest neutral square is used to calibrate the enlarger. Each square is labeled with its particular yellow filter correction and magenta filter correction incremental setting in a matrix form. Thus, the squares vary from (0,0) to (Y max; M max), according to the particular photo paper used, as seen in FIG. 6. As further shown, the matrix squares of the photograph 70 will vary over the color spectrum with distinct areas appearing for the primary colors and their complements, with blends therebetween. In the example given, neutral grey squares could appear, for example, at the square 40,50.

Figures 7, 8:
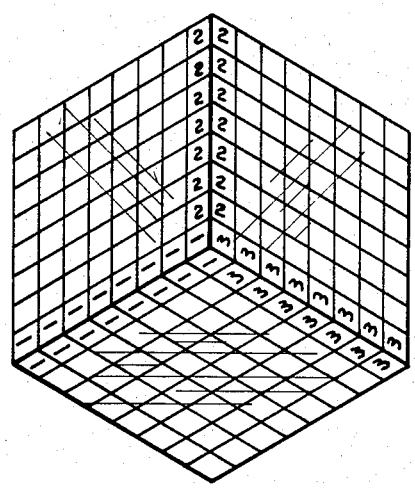
FIG. 7 is a top view of the exposure chart of the invention.
FIG. 8 is a top view of a trisector arrangement of photographs of FIG. 6, each based on a different one of the primary colors.

FIG. 7 is an exposure chart 80. It is divided into 5 to 15, preferably 7 to 12, equal spaces 81–89. Each space 81–89 has a corresponding exposure value 91–99 from 5 to ¼, preferably 3½ to ⅝. This exposure value is a function of f-stop and time, as is well known in the art. Each space varies in density with space 81 being white, space 89 being black, and the spaces 82–88 each being a different shade of grey. An exposure factor of 1.0 corresponds to an 18% grey shade and would indicate no exposure correction is required.

The photographer analyzes the photograph 70 and chooses one of the squares that he feels is the aesthetically best shade of grey. After this choice, he matches this grey, on the photograph 70, with one of the greys 82-88 of the exposure chart 80. Once he has found the color density 80 that most nearly matches his selected square of the photograph 70, he has determined the filter settings and the exposure correction of the exposure used for the test negative. The exposure setting is ascertained from the particular grey chosen from the exposure chart 80. The red, blue, and green filter settings are ascertained from the labeled incremental setting on the color chart 70 which corresponds to the matching shade of grey.

Having thus obtained the integrated calibration for the enlarger, film, printing paper, development chemistry and other process variables inherent in operator habit or routine, these values can be set into an analyzer and used to print pictures using the film, paper, chemistry, and enlarger used in making the calibration.

The same procedure can be used to obtain a calibration using any properly exposed negative or slide coupled with a diffuser to mix the colors and hues. This method permits printing the pictures without an analyzer provided the negatives or slides are similar in density and color balance. Also, it is immaterial whether the blue is exposed first or the green. Choice of axis is optional.

Should there be a green deficiency in the photograph printing system, green would then be used for the full paper 60 exposure instead of the red, and red and blue would be varied in like manner to blue and green in the description above.

Using this process, a slide or negative can be produced for a given film type to give color and exposure correction values without the use of the mechanical tray of FIG. 1 or the strips 31-39. By determining the correction for a particular photograph system, for example, enlarger, film, paper type, and emulsion, the three color correction trisectors can be printed with the neutral color at the (0,0) origin. Three matrices result, one with red as the background and green and blue light varied over a selected spectrum, another with green light as the background and blue and red light varied over a selected spectrum, and thirdly, with a blue background varying red and green light over a selected spectrum. This can be done for either slide film or with negatives. After the process is finished, the three sheets are joined together in a trisector fashion, as can be seen in FIG. 8. The photographs are attached together by conventional means in such a way that each axis represents one of the complementary colors being used, that is, yellow, magenta, and cyan.

When this has been completed, the conical shape resulting from rounding the sides of the trisectors can be stood on end and photographed. The resulting slide or negative can be used as a single exposure calibration for the enlarger, paper, developer, film system. Variations from one roll of film to the next are not considered here and the error resulting therefrom is neglected for sake of speed in printing. The corrections can be read directly from the print in like manner as before.

The tray of FIG. 1 and strips 31-39 can be used to enhance black and white photography as well. By making an image of grey strips from white to black, the size of the square matrix resulting from the exposures in the sheet 60 above identical in width to the strips 31-39, the image can be photographed with a particular kind of film. The negative resulting therefrom can be projected on the tray so that the different shades of grey coincide with the vertical chutes 40-49 of FIG. 3. The enlarger is deactivated, and the time of exposure set for 2 to 50 seconds, preferably 10 to 20 seconds. The strips are then placed horizontally in the tray after strips 28 and 29 have been set in position leaving one chute open at one end. The first chute is exposed at an exposure (f-stop) lower than that anticipated for perfect exposure. Each successive strip is moved to expose the next successive chute at a slightly higher f-stop until the entire paper 60 has been exposed. The paper is then developed normally and dried. The horizontal chute 40-49 that displays the most distinct gradations of grey from white to black is the correct exposure for that film and paper.

The same procedure can be used to optimize exposures by using a regular negative that is correctly exposed having varying density from white to black. Again focusing on the tray and incrementally moving the strips to uncover successive chutes while varying f-stop at a constant exposure time, will produce a lattice of exposures, bracketing the last exposure for the most distinct gradations of grey.

The preceding examples illustrate in detail the process of the instant invention. It is understood that the example is for illustrative purposes only and does not limit the invention in any way.

Thus it can be seen that the objects of the invention have been satisfied by the structure and technique presented hereinabove. While in accordance with the patent statutes only the best mode and preferred embodiment of the invention have been presented and described in detail, it is to be understood that the invention is as set forth in the following claims.

What is claimed is:

1. A process for making color prints, comprising the steps of:
   exposing photography paper to a first color light source;
   progressively and sequentially exposing first strips of said paper to decreasing amounts of light of a second color;
   progressively and sequentially exposing second strips of said paper to decreasing amounts of light of a third color, said second strips being normal to said first strips; and
   developing said paper after the steps of exposing, and obtaining therefrom a color matrix comprising a plurality of color elements.

2. The process according to claim 1 wherein each color element has associated therewith indications of light intensity levels to which said color element has been exposed.

3. The process according to claim 2 wherein said indications are filter settings of a color enlarger.

4. The process according to claim 3 wherein a grey level exposure chart is compared against said color elements for selection of a neutral grey element.

5. The process according to claim 4 which further includes selecting color density and exposure settings from said neutral grey element.

6. The process according to claim 1 which further includes the step of exposing and developing a second piece of photography paper in the manner set forth in claim 1, but interchanging said first and second colors, and exposing and developing a third piece of photography paper in the manner set forth in claim 1, but interchanging said first and third colors, obtaining three color matrices therefrom, and subsequently joining together said three color matrices in a trisector arrangement.

7. The process according to claim 6 which further includes the step of photographing said trisector arrangement and generating a transparency therefrom.

* * * * *